United States Patent [19]
Towle et al.

[11] Patent Number: 5,960,370
[45] Date of Patent: Sep. 28, 1999

[54] METHOD TO DETERMINE LOCAL VARIATIONS OF THE EARTH'S MAGNETIC FIELD AND LOCATION OF THE SOURCE THEREOF

[75] Inventors: James N. Towle, Seattle, Wash.; Donald H. Van Steenwyk, San Marino, Calif.

[73] Assignee: Scientific Drilling International, Houston, Tex.

[21] Appl. No.: 08/907,623

[22] Filed: Aug. 8, 1997

Related U.S. Application Data

[60] Provisional application No. 60/020,980, Aug. 14, 1996.

[51] Int. Cl.$^6$ ................................................. G06F 19/00
[52] U.S. Cl. ............................................................ 702/7
[58] Field of Search ................................ 702/6, 7, 9, 10, 702/11, 12, 13, 8; 33/302, 304, 313; 324/346; 175/45; 340/853.5

[56] References Cited

U.S. PATENT DOCUMENTS

| | | |
|---|---|---|
| 3,406,766 | 10/1968 | Henderson . |
| 3,725,777 | 4/1973 | Robinson et al. . |
| 3,731,752 | 5/1973 | Schad . |
| 3,745,446 | 7/1973 | Norris . |
| 3,853,185 | 12/1974 | Dahl et al. . |
| 4,072,200 | 2/1978 | Morris et al. . |
| 4,293,815 | 10/1981 | West et al. . |
| 4,372,398 | 2/1983 | Kuckes . |
| 4,443,762 | 4/1984 | Kuckes . |
| 4,458,767 | 7/1984 | Hoehn, Jr. . |
| 4,465,140 | 8/1984 | Hoehn, Jr. . |
| 4,480,701 | 11/1984 | Baldwin . |
| 4,486,863 | 12/1984 | French . |
| 4,529,939 | 7/1985 | Kuckes . |

(List continued on next page.)

FOREIGN PATENT DOCUMENTS

| | | |
|---|---|---|
| 682269 | 12/1995 | European Pat. Off. . |
| 2062235 | 5/1981 | United Kingdom . |
| 2186378 | 8/1987 | United Kingdom . |
| 2220072 | 12/1989 | United Kingdom . |
| 2275536 | 8/1994 | United Kingdom . |
| 2301438 | 4/1996 | United Kingdom . |

OTHER PUBLICATIONS

"Improved Detectability of Blowing Wells", John I. De Lange & Toby J. Darling, "SPE Drilling Engineering", *Society of Petroleum Engineers*, Mar. 1990, pp. 34–38.

"Magnetostatic Methods for Estimating Distance and Direction from a Relief Well to a Cased Wellbore", J.D. Robinson & J. P. Vogiatzis, Journal of Petroleum Technology, Jun. 1972, pp. 741–749.

"Improved Magnetic Model for Determination of Range and Direction to a Blowout Well", Douglas L. Jones et al., "SPE Drilling Engineering", Society of Petroleum Engineers, Dec. 1987, pp. 316–321.

"A Magnetostatic Well Tracking Technique for Drilling of Horizontal Parallel Wells", C. K. Pratt & R. A. Hartmann, *Society of Petroleum Engineers*, 1994, pp. 277–290.

"Case Histories Demonstate a New Method for Well Avoidance and Relief Well Drilling", Graham McElhinney et al., SPE/IADC Drilling Conference, Mar. 4–6, 1997, *Society of Petroleum Engineers*, pp. 807–814.

Paper: "Technology for Detecting Target Boreholes", Applied Navigation Devices, Jan. 3, 1992.

*Primary Examiner*—Donald E. McElheny, Jr.
*Attorney, Agent, or Firm*—William W. Haefliger

[57] ABSTRACT

A method to determine the earth's magnetic field vector along a sub-surface wellpath having unknown and possibly changing azimuth, in the presence of a magnetic disturbance caused by a magnetic source external to the wellpath includes estimating the three components of the earth field along the three axes of a magnetic sensor package by a polynomial function of measured depth along the wellpath. Magnetic survey accuracy is thereby improved. Upon removal of the earth's magnetic field from the measurements, the resultant magnetic field of the disturbance is determined and can be used to determine the position and orientation of the source of the disturbance.

22 Claims, 8 Drawing Sheets

U.S. PATENT DOCUMENTS

| | | |
|---|---|---|
| 4,560,928 | 12/1985 | Hayward . |
| 4,660,185 | 4/1987 | French . |
| 4,700,142 | 10/1987 | Kuckes . |
| 4,709,486 | 12/1987 | Walters . |
| 4,710,708 | 12/1987 | Rorden et al. . |
| 4,711,303 | 12/1987 | Koeling et al. . |
| 4,791,373 | 12/1988 | Kuckes . |
| 4,933,640 | 6/1990 | Kuckes . |
| 5,074,365 | 12/1991 | Kuckes . |
| 5,155,916 | 10/1992 | Engebretson . |
| 5,230,387 | 7/1993 | Waters et al. . |
| 5,305,212 | 4/1994 | Kuckes . |
| 5,394,141 | 2/1995 | Soulier . |
| 5,398,421 | 3/1995 | Nicolle et al. . |
| 5,435,069 | 7/1995 | Nicholson . |
| 5,452,518 | 9/1995 | DiPersio . |
| 5,485,089 | 1/1996 | Kuckes . |
| 5,512,830 | 4/1996 | Kuckes . |
| 5,564,193 | 10/1996 | Brooks . |

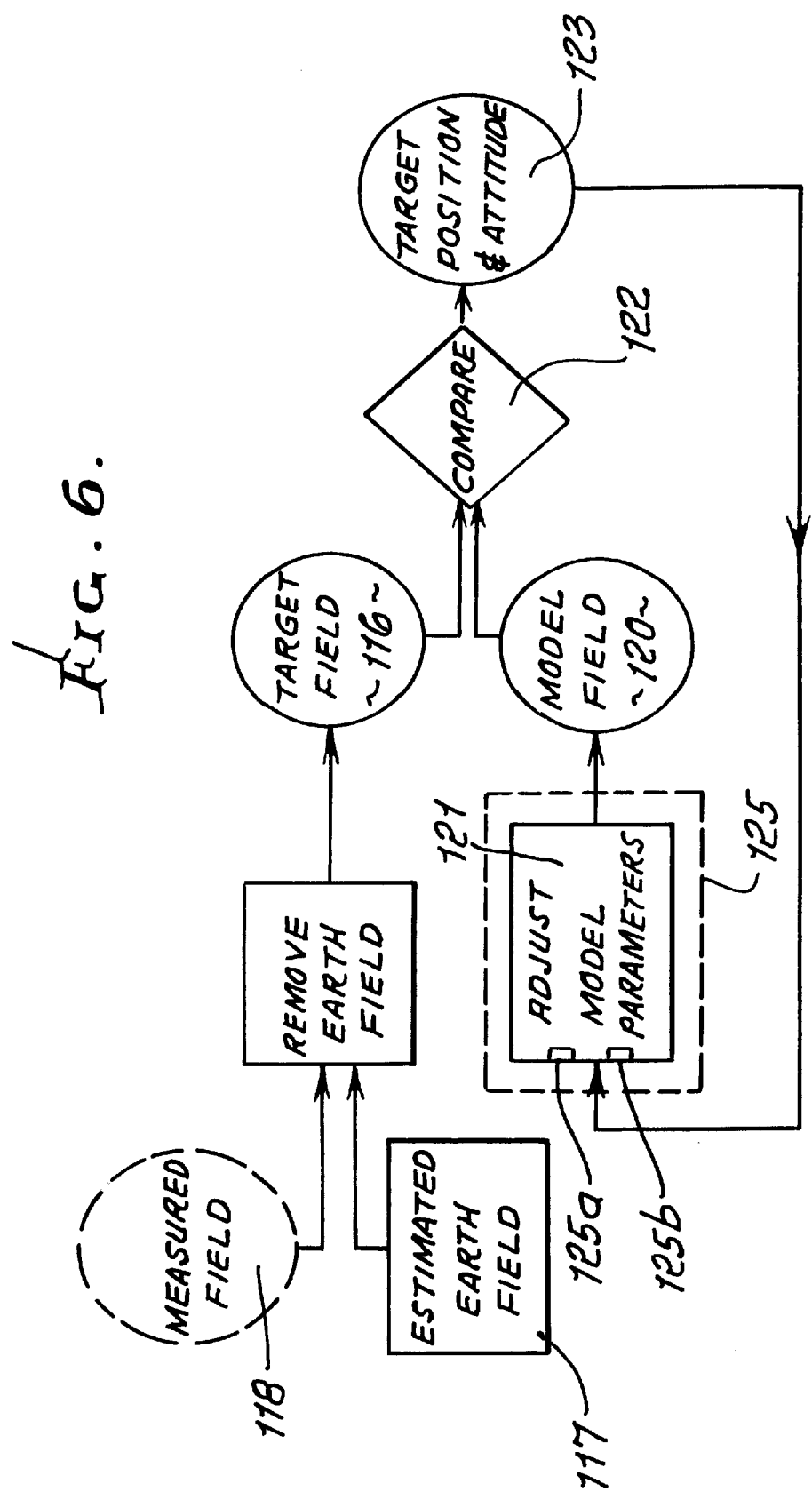

METHOD TO DETERMINE LOCAL VARIATIONS OF THE EARTH'S MAGNETIC FIELD AND LOCATION OF THE SOURCE THEREOF

This application claims priority from provisional application Ser. No. 60/020,980 filed Aug. 14, 1996, and incorporated herein by reference.

BACKGROUND OF THE INVENTION

This invention relates to a method to reduce inaccuracies in magnetic measurements in a wellbore. In measurement-while-drilling (MWD) magnetic surveys during drilling operations, and in wireline or multishot surveys of existing wellbores, inaccuracies in survey data are a source of uncertainty in position and true vertical depth of the wellbore. These inaccuracies may be due to instrument error or magnetic interference. This invention is concerned with method and means to reduce the effects of magnetic interference on survey accuracy.

In the prior art, effort has been directed to the reduction of systematic magnetic survey inaccuracies. Corrections for drillstring interference and other systematic errors are disclosed by Engebretson et al. in U.S. Pat. No. 5,155,916. Similarly, U.S. Pat. No. 5,452,518 discloses a method to reduce along-axis interference. U.S. Pat. No. 5,564,193 discloses a method wherein the transverse, as well as axial component of drillstring interference is determined by a series of magnetic measurements, with the drillstring displaced angularly about its axis. U.S. Pat. No. 5,398,421 discloses a method whereby a sequence of longitudinally spaced shots, having differing rotation angles along the wellbore are combined, in a regression analysis to determine a local perturbation in the earth magnetic field associated with the drillstring.

Similarly, in U.S. Pat. No. 5,435,069, Nicholosen discloses a method whereby multiple vector magnetic and gravity measurements along a curved wellpath may be used to determine a perturbating magnetic field associated with the drilling or logging string.

The prior art also discloses methods to determine the location and attitude of a source of magnetic interference. U.S. Pat. No. 3,725,777 describes a method to determine the earth's field from a magnetic compass and total field measurements, and then calculate the deviations, due to the external source of magnetic interference. The magnetic field of a long cylinder is then fitted to the magnetic deviations in a least-squares sense. The method requires that the magnetic field measurements be taken on a straight wellpath.

U.S. Pat. No. 4,458,767 describes a method by which the position of a nearby well is determined from the magnetic field produced by magnetized sections of casing. There is no description of a method by which the earth field is removed from the magnetic measurements.

European Patent Application GB9409550 discloses a graphical method for locating the axis of a cylindrical magnetic source from borehole magnetic field measurements acquired at intervals along a straight wellbore.

U.S. Pat. No. 5,512,830 described a method whereby the position of a nearby magnetic well casing is determined by approximating the static magnetic field of the casing by a series of mathematical functions distributed sinusoidally along the casing. In an earlier paper (Jones et al.), a method was described whereby the static magnetic field of a casing was approximated by an exponential function.

In the above references, no method is described whereby the earth field is determined along a wellpath having unknown and possibly changing azimuth, so as to determine local variations in the magnetic field vector along the wellpath.

U.S. Pat. Nos. 5,230,387 and 4,072,200 disclose a method whereby the magnetic field gradient is measured along a wellbore for the purpose of locating a nearby magnetic object. The gradient is calculated by measuring the difference in magnetic field between two closely spaced measurements; and because the earth field is constant over a short distance, the effect of the earth field is removed from the gradient measurement. The location and attitude of source external to the drillstring can then be determined by comparison with theoretical models of the magnetic field gradient produced by the external source.

The above efforts to improve magnetic surveys and locate sources of magnetic interference external to the wellbore evidence the need for the present invention.

SUMMARY OF THE INVENTION

The present invention provides a method for determining the azimuth and variations of azimuth with measured depth of a wellbore from magnetic measurements along the wellbore in the presence of local magnetic field variations caused by a source of magnetic field external to the wellbore.

The present invention provides method and means to determine the earth's magnetic field in the presence of magnetic interference, due to a nearby magnetic object not associated with the drilling or logging string. The purpose of the invention is to reduce inaccuracies in magnetic wellbore surveys, and also to provide method and means to identify the magnetic field itself of a nearby magnetic object of magnetic source, for subsequent analysis or determination of the position and attitude of the object.

In accordance with the present invention, vector magnetic field measurements are taken at intervals along a wellpath, not necessarily straight, having unknown and possibly changing azimuth. By use of a mathematical function having parameters to represent the azimuth and changes along the wellpath, an approximation to the earth's magnetic field vector, as measured by a 3-component borehole magnetometer along the wellpath is determined. The parameters of this mathematical approximation are then adjusted to fit lower order variations of the measured magnetic field vector, such lower order variations being caused by changes in the wellbore azimuth.

The present invention also describes a method whereby local magnetic field variations along the borehole are determined and used to determine the location and orientation of the source of local magnetic field variations along the wellbore.

The present invention also describes a method whereby the influence of the magnetic permeability of a wellbore casing or other magnetic object on the estimate of location and orientation, commonly known as "smearing", are reduced.

An important object of the invention is to provide, in a method of determining the position and angular attitudes of a sub-surface source of magnetic field disturbance relative to the sub-surface curved path of a wellbore, the steps that include:

a) obtaining a determined magnetic field of the source from measurements of total magnetic field at locations along the path, b) providing an adjustable parametric model of the source wherein the source magnetic field position and attitude are a function of the position and attitude parameters of the source, c) deriving from the parametric model an estimate of the magnetic field of the source, d) comparing the determined magnetic field of the source with the estimate of the magnetic field of the source, to produce a difference value or values, e) and adjusting the parametric model position and attitude parameters to minimize the difference value or values.

These and other objects and advantages of the invention, as well as the details of an illustrative embodiment, will be more fully understood from the following specification and drawings, in which:

DRAWING DESCRIPTION

FIG. 4 shows the local magnetic interference calculated by subtracting a 3-order estimate of the earth magnetic field along the wellbore;

FIG. 6 is a flow chart showing the process of locating the source of local magnetic variations along a wellbore by adjusting magnetic model parameters to agreement with measured magnetic deviations;

DETAILED DESCRIPTION

Figure 1:
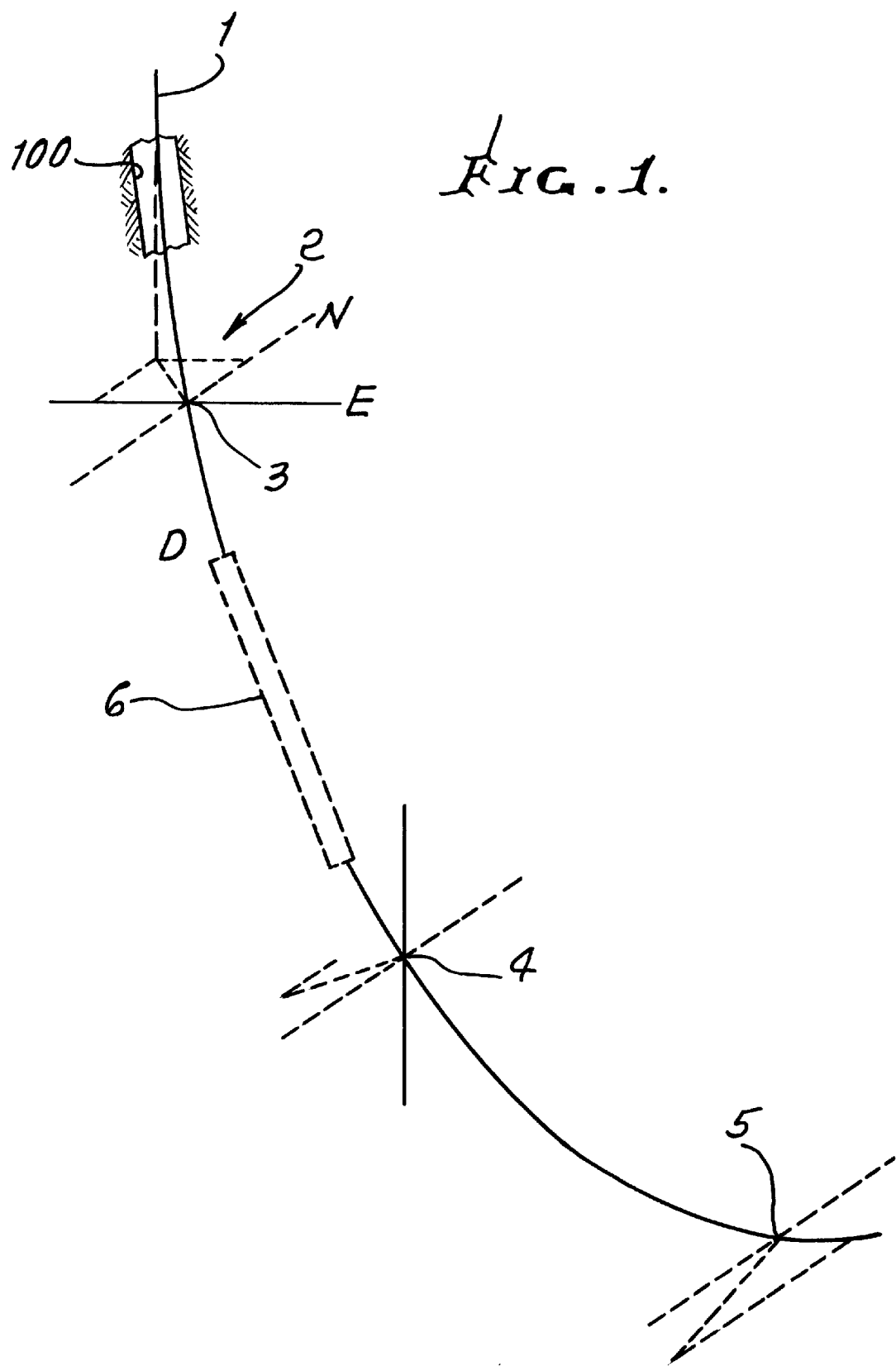
FIG. 1 is an isometric view of a wellpath with a 3-component magnetic sensor package and gravity sensing package shown.

The present invention is more easily understood by a detailed description of a preferred embodiment. FIG. 1 shows a wellpath or wireline 1 described by its inclination and azimuth with respect to an external North, East, Down, Rectangular coordinate system 2 at a series of locations or points 3, 4, 5 along the borehole or wellpath. The bore appears at 100.

Figure 2:
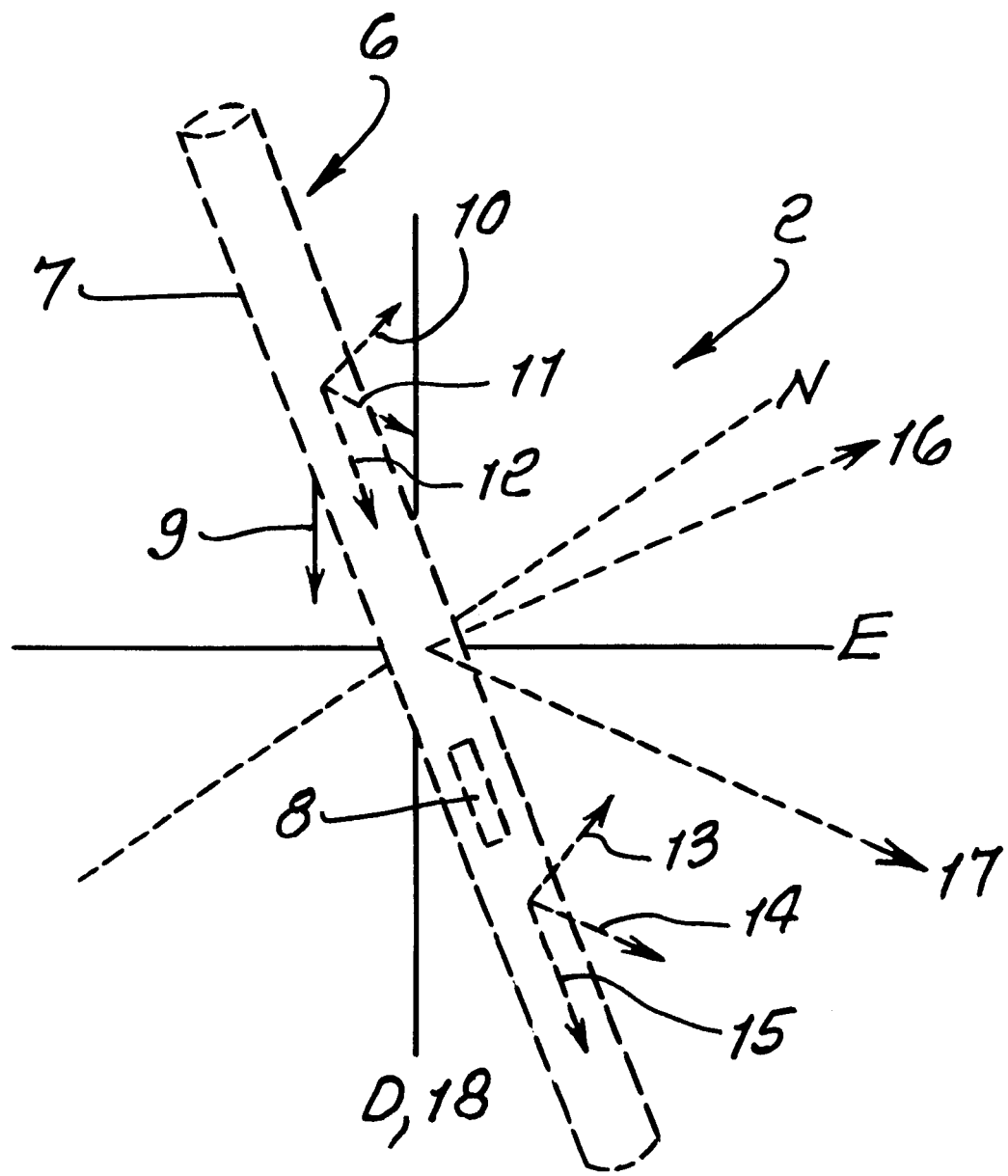
FIG. 2 is a detailed view of the coordinate axes of the 3-component gravity sensing package, 3-component magnetic sensing package, and reference axes.

In a preferred embodiment, an instrument housing 6, attached to a wireline, carries a 3-component magnetic sensor package 7 seen in FIG. 2, and usually of the fluxgate type, and a means 8 for measuring the local direction of gravity, as shown in FIG. 2, for example with respect to the wellbore direction. The instrument housing traverses the wellpath, along its length, making measurements of the vector magnetic field and gravity vector at a series of points along the wellpath. The instrument housing may be fixed to the bottom hole assembly of the drillstring or attached to wireline in an open hole. Instrumentation of this general type is disclosed in U.S. Pat. Nos. 5,398,421, 5,564,193, 5,452,518, and 5,435,069, and references cited therein.

Measurements along the 3-component axes of the magnetic sensor package at each measurement point are resolved using the gravity vector 9 measured on or along 3-perpendicular axes 10, 11 and 12 to determine tool inclination and rotation about the tool axis. An Euler rotational transformation is then used to convert the measurements on the magnetic sensor axes 13, 14 and 15 to equivalent values in a rectangular coordinate system having one horizontal component 16 in the direction of the wellpath at the measurement point, a second horizontal component 17 perpendicular to the wellpath direction, and a downward (vertical) component 18. Circuitry within 7 may be used to provide the Euler transformation. Components 16, 17, and 18 are magnetic components.

Equation 1, set forth below, is descriptively associated with one embodiment of the invention. In this embodiment, the earth magnetic field vector Bx in the horizontal plane (N,E in FIG. 2) is represented by an estimate of the horizontal earth field magnitude, H, and by a third order function of distance along the wellpath, az(md);

$$Bx = H^* \cos(az(md)) \qquad (1)$$

and similarly, the earth magnetic vector By in the horizontal plane (where vector By is normal to vector Bx) is represented by the expression:

$$By = H^* \sin(az(md)) \qquad (2)$$

where $$az(md) = a0 + a1^*(md - Md0) + a2^*(md - md0)^2 \qquad (3)$$

In this embodiment, the parameters H, a0, a1, and a2 are or can be adjusted to cause the calculated quantities to match the horizontal components X, Y in a least-squares sense, such that the value:

$$F = \text{sum}(X - Bx)^2 - ((Y - By)^2) \qquad (4)$$

is minimized. The indication "sum" indicates the summation over a set of measurements along the wellbore. The resulting vector magnetic field estimate (Bx,By) then approximates the earth field vector along the wellpath. Parameter md0 is a reference depth along the wellpath.

Figure 3:
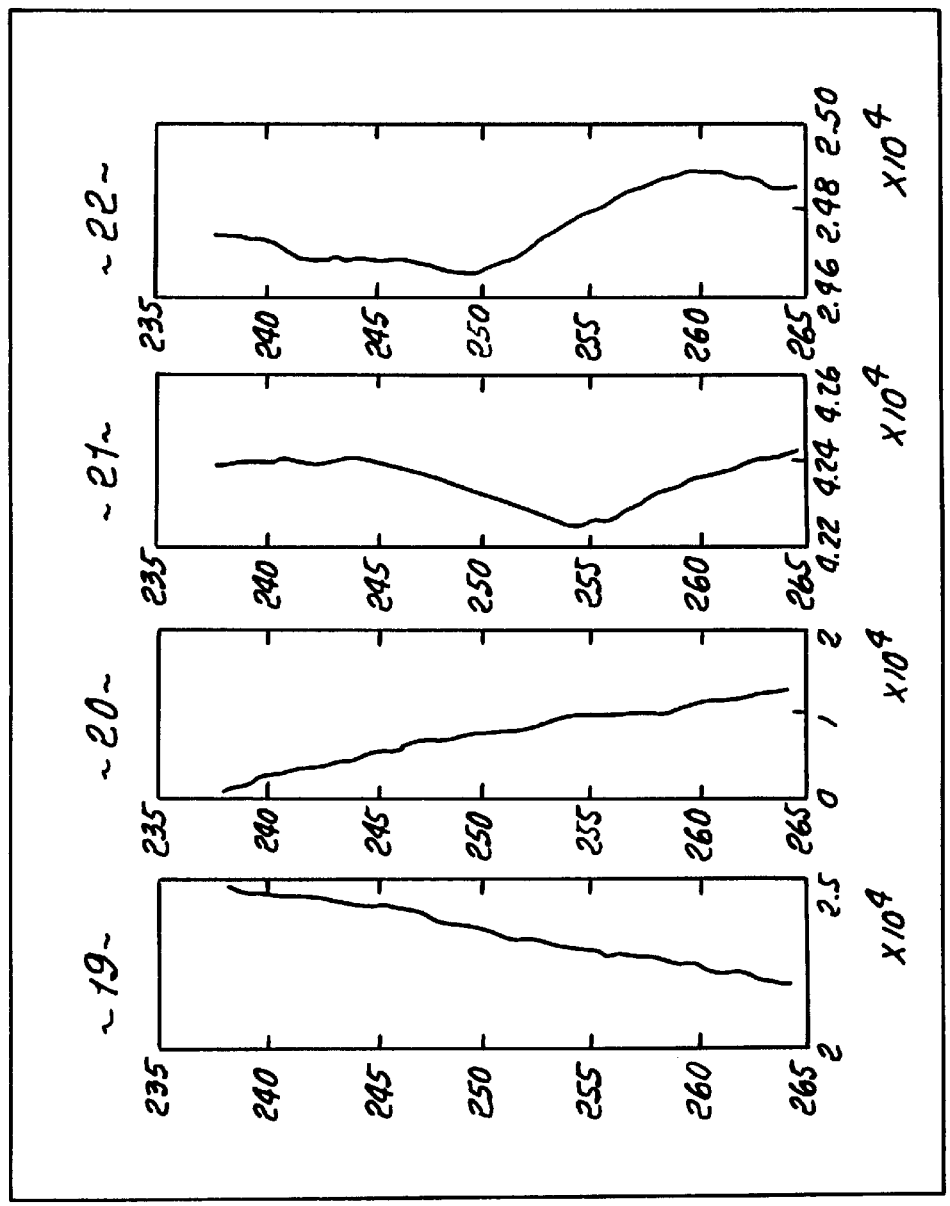
FIG. 3 is a representative or diagrammatic view of the three components of the measured magnetic field and the total magnetic field measured along a wellpath.
Figure 9:
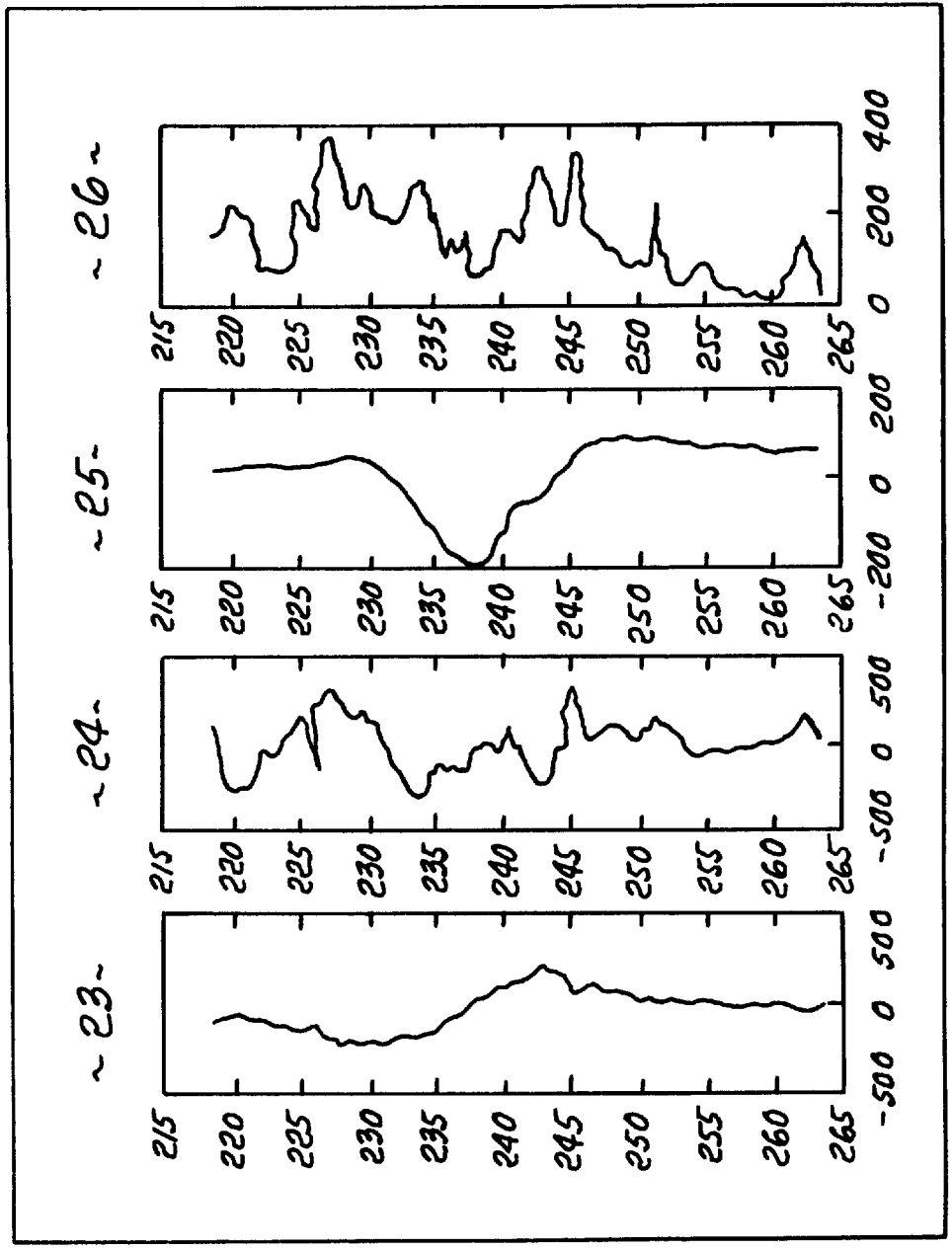

An example of total magnetic field components measured along a wellpath, such as that in FIG. 1, is shown in FIG. 3. While the horizontal components (for two different locations 19 and 20 along the wellbore) of the magnetic field are large, the presence of a magnetic disturbance is observed directly in the field vertical component seen at said two different locations, and represented at charts (amplitude vs. borehole location) 21 and 22. Upon applying the algorithm described above, an approximation to the earth magnetic field vector along the measurement path in the wellbore is obtained, and upon subtraction of the earth magnetic field vector from the total magnetic field vector along the wellbore, the resultant magnetic field vector of the disturbance at various locations along the wellbore is obtained, as shown at 23–26 in FIG. 4.

Figure 5:
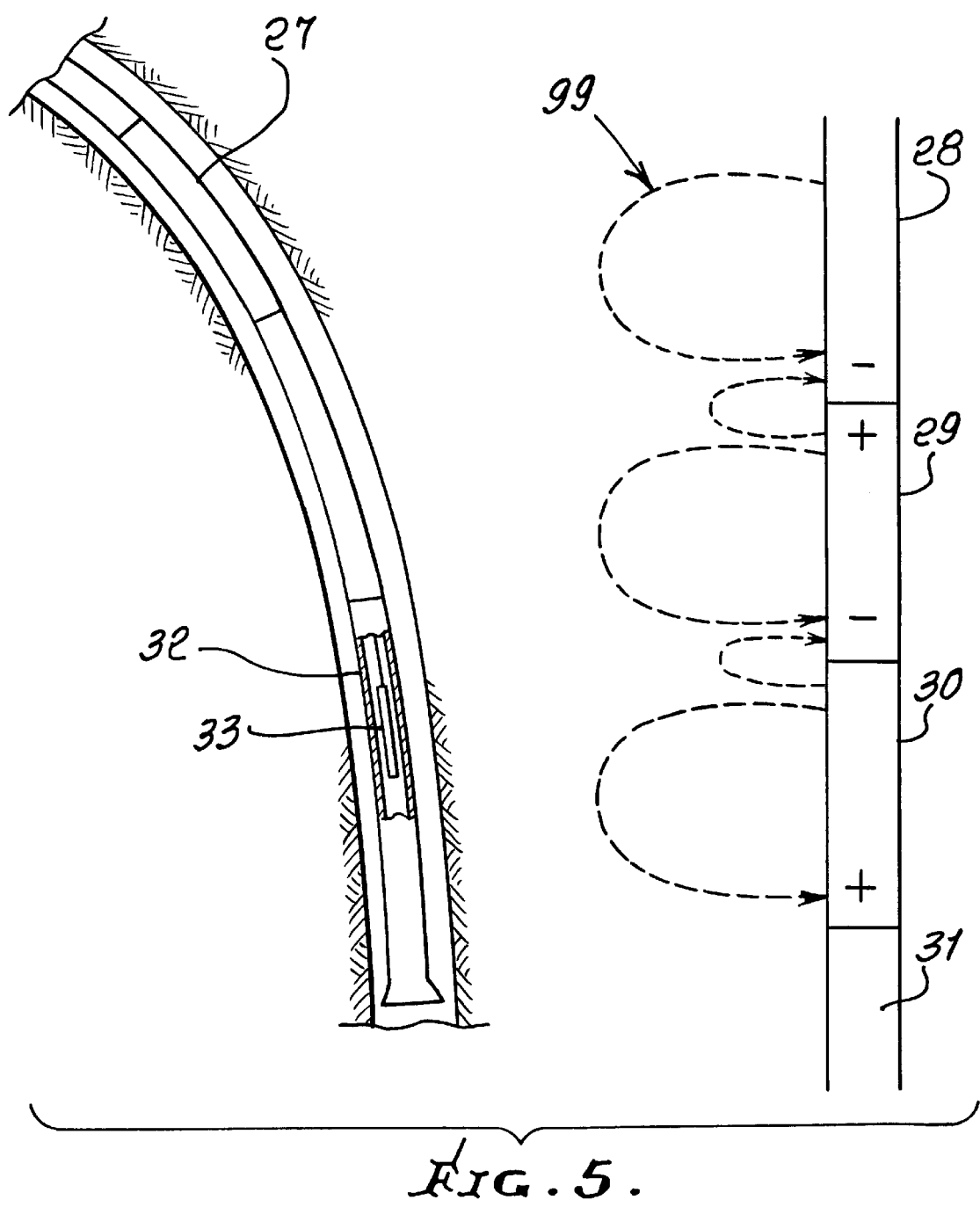
FIG. 5 shows a schematic form of the magnetic field of a local source of magnetic variations along the wellbore.

Having determined the vector magnetic field of the disturbance along the wellpath as detailed above, the location of the source of magnetic field disturbance can be determined. FIG. 5 shows the relation between the wellpath 27 and source of magnetic field variations. In a preferred embodiment, the source of magnetic variations is a connected series of well casing segments 28, 29, 30, and 31 defining the wellpath or borehole. Magnetic field lines are shown at 99. The number 32 represents a non-magnetic drill collar; and number 33 represents an instrument housing suspended in the pipe storing.

In another preferred embodiment, apparatus and method, as shown in FIG. 6, determine the position and attitude of the source of magnetic field disturbance. The vector magnetic field 116 of the target object along the wellpath is determined by subtracting the earth field components 117 along the wellpath, as determined by the method of the invention, from the measured field 118, along the wellpath. The resultant vector magnetic field 116 of the target object is then compared at comparator 122 with the model field 120 produced by a parametric model 125, with the parameters 125a and 125b of the model adjusted, as represented at 121 until a suitable agreement is achieved. Typical parameters are produced by resistance, capacitance and inductance in model circuitry. Such agreement may be made by visual observations. The position and attitude of the target, as seen at 123, are then known from the known parameters of the model 125. Such parameters are typically indicated by computer software data. FIG. 6 may be regarded as a circuitry functional block diagram.

Another aspect of the invention permits reduction of errors in estimated source position, caused by the effect known as "smearing". This term refers to the effect on the magnetic fields of a monopole pair, which exist on a magnetized iron object caused by the magnetic permeability of the iron itself. The magnetic field of an iron object, magnetized along its long axis, is approximately described by monopoles, for the purposes of estimating range and attitude, such monopoles located a short distance from the extremities of the object. The actual field is the field of this monopole pair modified by the iron object itself, which typically provides a low permeability path for a portion of the magnetic flux caused by the remnant magnetization of the object. The phenomena of smearing are represented in FIGS. 7(a) and 7(b)

Figure 7A:
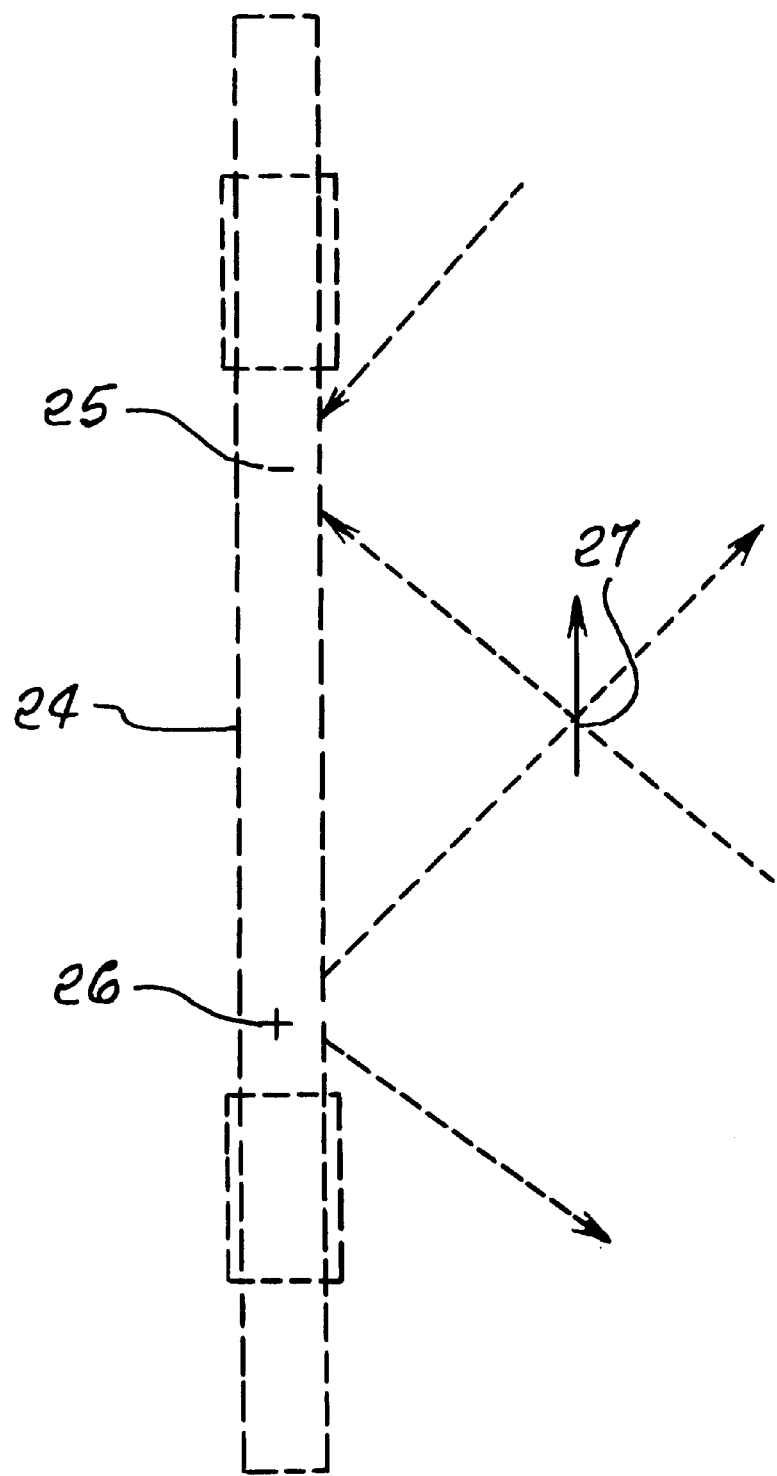
FIG. 7(a) illustrates an aspect of the invention used to reduce the influence of smearing.

In the aspect of the invention shown in FIG. 7(a), the magnetic field vectors of an ideal pair of monopoles 25 and 26, caused by the remnant magnetization of the object, i.e., target, steel wall casing section 24 are shown as they would exist without smearing. The summation of the fields from each monopole results in the total field 27 of the casing. The casing is shown in broken lines representing the absence of smearing.

Figure 7B:
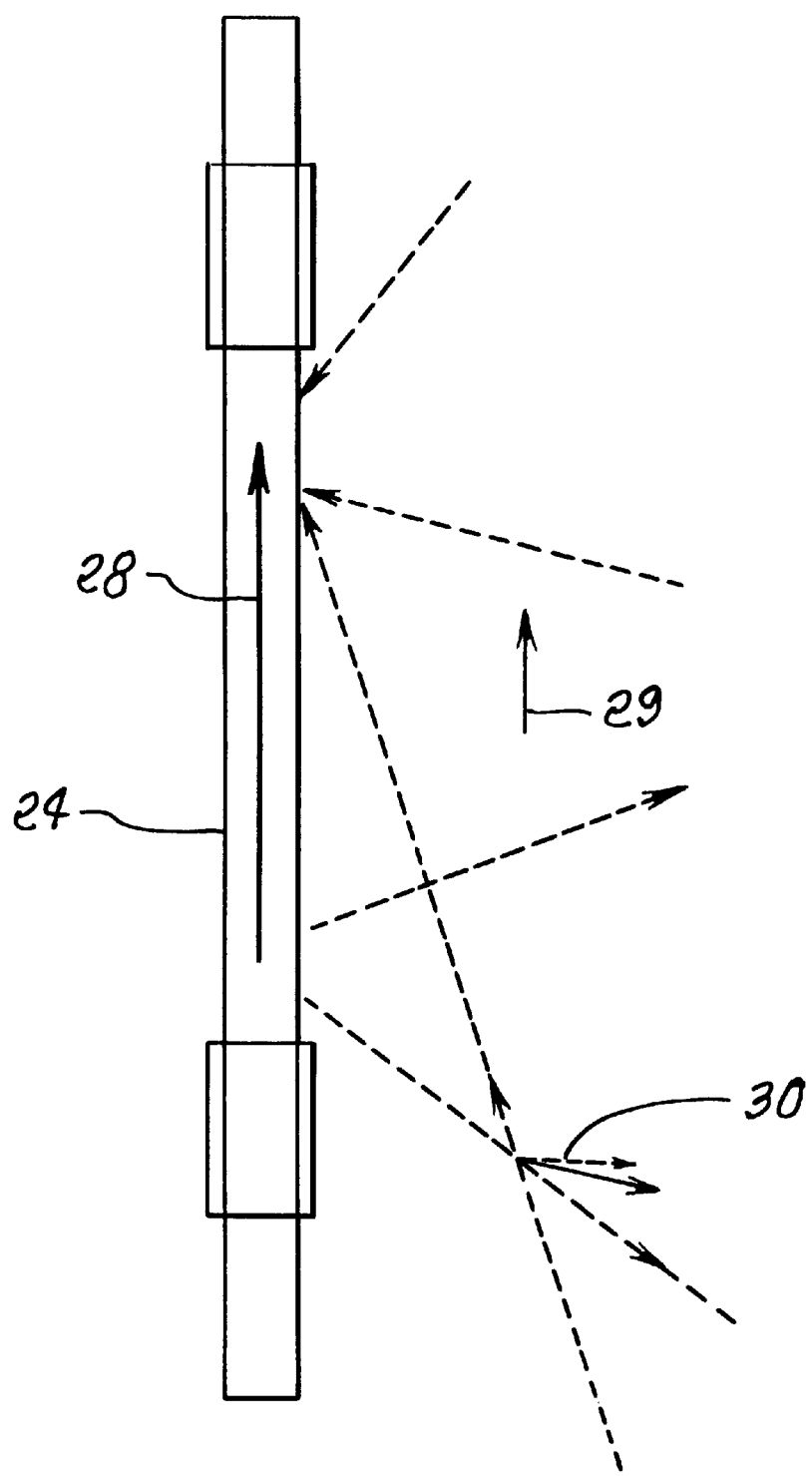
FIG. 7(b) is similar to FIG. 7(a) but also showing a source of magnetic interference.

In FIG. 7(b), the effect of the casing permeability is shown. A portion 28 of the magnetic field of the monopoles, parallel to the casing is, shown on the casing, resulting in a reduced axial field 29 external to the casing. The effect is to cause an error in the estimate of distance to the casing if a simple model comprising only the field of the two monopoles is used.

In one preferred embodiment of the invention, a well is drilled, as in FIG. 5, to within close proximity and approximately parallel to the source of magnetic disturbance, in this case, an adjacent wellbore lined with sections 28–31 of wellbore casing. See also casing 24 in FIG. 7(b). Since the transverse (cross-axis) component 30 of the field of the casing is unaffected by its permeability, the cross-axis field can be used to estimate the range to the target without error caused by smearing.

I claim:

1. In a method to determine the direction of a sub-surface arbitrary path in a sub-surface magnetic field composed of a spatially fixed magnetic field component and a spatially varying magnetic field component, the steps including:
    a) determining the vector components of a total magnetic field vector at each of a plurality of measured depth locations along said path, said components at each location comprising a first vector component in the direction of said path, and a second vector component lying in a plane normal to said path,
    b) determining the direction of the gravity vector at each of said plurality of locations along said path,
    c) using said determined direction of the gravity vector at each location to resolve said determined total field vector components into resolved horizontal and vertical components of said total field, said resolved components comprising a horizontal component in the direction of said path, and a horizontal component perpendicular to said path, and lying in a vertical plane which contains said first vector in the direction of said path,
    d) estimating the direction of said path with respect to said fixed magnetic field component path at each said location as a mathematical function of distance of said location along the path,
    e) estimating the magnitude of said fixed horizontal magnetic field,
    f) calculating estimated horizontal magnetic field components from said estimated fixed magnetic field and said mathematical function, at each said location,
    g) adjusting the parameters of said mathematical function and said estimate of fixed horizontal magnetic field to match one of the following variations in said estimated horizontal magnetic field components with said measured horizontal magnetic field components:
        i) fixed variations
        ii) fixed and lower order variations.

2. The method of claim 1 wherein said fixed magnetic field component is the earth's natural magnetic field in a sub-surface formation.

3. The method of claim 1 wherein said path is a wellbore in a sub-surface formation.

4. The method of claim 1 wherein said spatially varying component is provided by a magnetic object proximate said path.

5. The method of claim 1 wherein said lower order variations are limited to a constant value.

6. The method of claim 1 wherein said lower order variations comprise a constant and a linear variation with respect to distance along the path.

7. The method of claim 1 wherein said lower order variations comprise a constant and a linear, and second and third order variations.

8. The method of claim 2 wherein said estimate of the horizontal component of the earth's natural magnetic field is calculated from predetermined earth field models.

9. The method of claim 2 wherein said estimate of the horizontal component of the earth's field is determined from direct measurement in a region free from spatial variations.

10. The method of claim 6 wherein said region free from spatial variations is within a wellbore.

11. The method of claim 1 wherein said a) and b) step determinations are measurements taken by operation of instrumentation contained in a sub-surface drillstring.

12. The method of claim 1 wherein said a) and b) step determinations are measurements taken by operation of instrumentation suspended from a wireline in a sub-surface wellbore.

13. In the method to determine the vector magnetic field of an object source of magnetism proximate a wellbore, the steps including:
    a) determining the earth magnetic field along said wellbore by the method of claim 1, and
    b) subtracting said determined earth magnetic field from measured total magnetic field along said wellbore.

14. A method to determine the position and attitude of a source of magnetic field disturbance along a sub-surface wellbore comprising the steps of:
    a) obtaining a determined magnetic field of said source of magnetic field disturbance by the method of claim 13,
    b) deriving an estimated magnetic field of the source from a parametric model of said source descriptive of the position and attitude of said source of magnetic field disturbance, c) comparing said determined magnetic field of said source with said estimated magnetic field, d) adjusting the parameters of said parametric model to minimize the difference between said determined magnetic field and said parametric model estimate of the source magnetic field along the wellbore.

15. The method of claim 14 wherein said parametric model is a superposition of one or more magnetic monopoles.

16. The method of claim 14 wherein said difference is minimized by minimizing a mathematical function which is a summation of the square of the difference between the measured and estimated fields at each said location.

17. The method of claim 16 wherein said mathematical function is a combination of components of the magnetic field of the source which is a function of the position and orientation of the source with respect to said locations.

18. The method of claim 16 wherein magnetic field components traverse to the axis of the source are used in said mathematical function, such transverse components being the only components used.

19. The method of claim 14 wherein said difference is a visual estimate of the best agreement of values of said parameter model with corresponding values of said source.

20. In the method of determining the position and angular attitudes of a sub-surface source of magnetic field disturbance relative to the sub-surface curved path of a wellbore, the steps that include:

a) obtaining a determined magnetic field of said source from measurements of total magnetic field at locations along said path, b) providing an adjustable parametric model of said source wherein the source magnetic field position and attitude are a function of the position and attitude parameters of the source, c) deriving from said parametric model an estimate of the magnetic field of the source, d) comparing said determined magnetic field of the source with said estimate of the magnetic field of the source, to produce a difference value or values, e) and adjusting said parametric model position and attitude parameters to minimize said difference value or values.

21. The method of claim 20 wherein said source contains iron, the wellbore everywhere located in spaced relation to said source.

22. The method of claim 20 wherein the match of said measured and said estimate of magnetic field components is represented by the expression:

$$F = \text{sum}(X-Bx)^2 - (Y-By)^2)$$

where:

$$Bx = H^* \cos(az(md))$$

$$By = H^* \sin(az(md))$$

where:

$$az(md) = a0 + a1^*(md - Md0) + a2^*(md - md0)^2$$

where:

X and Y are horizontal components of the measured magnetic field at each of a series of measurement locations along the wellbore where:

"sum" indicates summation over a set of measurements of magnetic field at locations along the wellbore and, where:

md(0) is a reference depth along the wellbore.

* * * * *

UNITED STATES PATENT AND TRADEMARK OFFICE
CERTIFICATE OF CORRECTION

PATENT NO.   : 5,960,370
DATED        : September 28, 1999
INVENTOR(S)  : James N. Towle and Donald H. Van Steenwyk Page 1 of 1

It is certified that error appears in the above-identified patent and that said Letters Patent is hereby corrected as shown below:

Column 6,
Line 4, "tion of said path, and a horizontal component perpen-" should read
-- tion of said path, a horizontal component perpen- --
Line 5, "dicular to said path, and lying in a vertical plane which" should read -- dicular to said path, and a vertical component lying in a vertical plane which --

Signed and Sealed this

Eighteenth Day of September, 2001

*Attest:*

*Attesting Officer*

NICHOLAS P. GODICI
*Acting Director of the United States Patent and Trademark Office*